US011449601B2

(12) United States Patent
Bursell (10) Patent No.: US 11,449,601 B2
(45) Date of Patent: Sep. 20, 2022

(54) PROOF OF CODE COMPLIANCE AND PROTECTED INTEGRITY USING A TRUSTED EXECUTION ENVIRONMENT

(71) Applicant: Red Hat, Inc., Raleigh, NC (US)

(72) Inventor: Michael Hingston McLaughlin Bursell, Famborough (GB)

(73) Assignee: Red Hat, Inc., Raleigh, NC (US)

( * ) Notice: Subject to any disclaimer, the term of this patent is extended or adjusted under 35 U.S.C. 154(b) by 323 days.

(21) Appl. No.: 16/736,976

(22) Filed: Jan. 8, 2020

(65) Prior Publication Data

US 2021/0209224 A1    Jul. 8, 2021

(51) Int. Cl.
*G06F 21/00* (2013.01)
*G06F 21/53* (2013.01)
*H04L 9/08* (2006.01)
*G06F 21/60* (2013.01)
*G06F 21/54* (2013.01)

(52) U.S. Cl.
CPC .............. *G06F 21/53* (2013.01); *G06F 21/54* (2013.01); *G06F 21/602* (2013.01); *H04L 9/0822* (2013.01)

(58) Field of Classification Search
CPC ........ G06F 21/53; G06F 21/54; G06F 21/602; H04L 9/0822; H04L 9/14; H04L 9/0897
See application file for complete search history.

(56) References Cited

U.S. PATENT DOCUMENTS

| 10,176,095 | B2 | 1/2019 | Ferguson et al. | |
|---|---|---|---|---|
| 2002/0065934 | A1* | 5/2002 | Kameyama | G06F 9/544 709/237 |

(Continued)

FOREIGN PATENT DOCUMENTS

| AU | 2003224737 A8 * | 10/2009 | ........... G01N 23/223 |
|---|---|---|---|
| CA | 2779056 A1 * | 5/2011 | ......... H04N 21/2541 |

(Continued)

OTHER PUBLICATIONS

Atamlireineh, et al., "A Framework for Application Partitioning using Trusted Execution Environments", 2010, Department of Computer Science, University of Oxford, https://ora.ox.ac.uk/objectsuuid:8f01389d-1fa8-4771-917c-750fa65bbdee/download_file?file_format=application/pdf&safe_filename=A_Framework_for_Application_Partitioning_using_Trusted_Execution_Environments___Concurrency_and_Computation.pdf&type_of_work=Conference%20item, 23 pages.

(Continued)

*Primary Examiner* — John B King
(74) *Attorney, Agent, or Firm* — Lowenstein Sandler LLP (57) ABSTRACT

The technology disclosed herein enables a first computing process to execute within a trusted execution environment to protect its data from other processes while selectively enabling a second computing process (e.g., a kernel process) to inspect data for compliance. An example method may include: establishing, by a processor, a trusted execution area for the first computing process, wherein the trusted execution area comprises an encrypted storage area; copying data of the first computing process into the trusted execution area, wherein the data comprises executable data or non-executable data; enabling the second computing process to access the copy of the data of the first computing process; and executing, by the processor, the first computing process using the trusted execution area.

19 Claims, 6 Drawing Sheets

(56) References Cited

U.S. PATENT DOCUMENTS

| | | | | |
|---|---|---|---|---|
| 2003/0229794 | A1* | 12/2003 | Sutton, II | G06F 12/1491 |
| | | | | 713/189 |
| 2009/0260052 | A1* | 10/2009 | Bathula | G06F 21/556 |
| | | | | 726/1 |
| 2010/0146267 | A1* | 6/2010 | Konetski | G06F 21/53 |
| | | | | 713/150 |
| 2014/0006711 | A1* | 1/2014 | Xing | G06F 3/0623 |
| | | | | 711/118 |
| 2015/0143374 | A1* | 5/2015 | Banga | G06F 9/5077 |
| | | | | 718/1 |
| 2016/0371495 | A1* | 12/2016 | Bhat | G06F 21/445 |
| 2017/0026181 | A1* | 1/2017 | Chhabra | H04L 9/3234 |
| 2017/0286645 | A1* | 10/2017 | Pandey | G06F 12/0822 |
| 2017/0344731 | A1* | 11/2017 | Gefflaut | G06F 21/6218 |
| 2017/0364707 | A1* | 12/2017 | Lal | G09C 1/00 |
| 2018/0101677 | A1 | 4/2018 | Dimitrios et al. | |
| 2018/0285143 | A1* | 10/2018 | Bacher | G06F 21/60 |
| 2019/0026476 | A1* | 1/2019 | Van Riel | G06F 12/1009 |
| 2019/0116030 | A1* | 4/2019 | Wiacek | H04L 63/145 |
| 2019/0220625 | A1 | 7/2019 | Durham et al. | |
| 2019/0362083 | A1* | 11/2019 | Ortiz | G06N 20/00 |
| 2021/0117546 | A1* | 4/2021 | Finchelstein | G06F 21/53 |

FOREIGN PATENT DOCUMENTS

| | | | | |
|---|---|---|---|---|
| CN | 104239812 A | * | 12/2014 | G06F 21/34 |
| CN | 104463007 A | * | 3/2015 | G06F 21/604 |
| CN | 105447387 | | 3/2016 | |
| EP | 3825851 A1 | * | 5/2021 | G06F 12/1009 |
| JP | 3826626 B2 | * | 9/2006 | G06F 12/0276 |
| WO | WO-2017182089 A1 | * | 10/2017 | G06F 12/1425 |

OTHER PUBLICATIONS

Atamlireineh, et al., "Securing Application with Software Partitioning: A case study using SGX", Jun. 9, 2017, Department of Computer Science, University of Oxford, https://arxiv.org/pdf/1706.03006.pdf, 19 pages.

Alder, Fritz et al., "S-FaaS: Trustworthy and Accountable Function-as-a-Service using Intel SGX", Oct. 14, 2018, Aalto University, Intel Labs, https://arxiv.org/pdf/1810.06080.pdf, 16 pages.

Ning, Zhenyu, "Position Paper: Challenges Towards Securing Hardware-assisted Execution Environments", Jun. 25, 2017, Department of Computer Science Wayne State University Detroit, http://www.cs.wayne.edu/~weisong/papers/ning17-tee.pdf, 8 pages.

* cited by examiner

PROOF OF CODE COMPLIANCE AND PROTECTED INTEGRITY USING A TRUSTED EXECUTION ENVIRONMENT

TECHNICAL FIELD

The present disclosure generally relates to computer systems that provide isolation between computing processes, and is more specifically related to computer systems that may use a Trusted Execution Environment (TEE) to enable a lower privileged process (e.g., application or virtual machine) to isolate its data from higher privileged processes (e.g., operating system or hypervisor).

BACKGROUND

Computer systems often provide process isolation to limit interactions between processes and enhance the confidentiality and integrity of the processes. Process isolation is typically provided between different lower privileged processes (e.g., user space processes) and prohibits one of the lower privileged processes from accessing data of another lower privileged process. Process isolation rarely protects the data of a process from all processes and typically higher privileged processes have access to the data of a lower privileged process. Many computer architectures enable this so that the higher privileged processes can manage the lower privileged processes. For example, the higher privileged processes may be for an operating system or hypervisor and may be responsible for managing access and execution of the lower privileged processes of an application or virtual machine.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Modern computer systems have begun using trusted execution environments (TEEs) to enhance the isolation of data of a computing process from other processes executing on the computer system. A trusted execution environment may use hardware based encryption to encrypt the data of a lower privileged process so that higher privileged computing processes do not have access to the data in an unencrypted form. This enables a lower privileged process to isolate its data from the higher privileged processes even though the higher privileged processes may be responsible for managing the data. This may be problematic in certain situations because one of the higher privileged processes may be associated with a kernel of the computer system and may be responsible for inspecting the data to ensure that it is compliant with one or more rules (e.g., absent malicious executable code).

Aspects of the present disclosure address the above and other deficiencies by providing technology that enables a first computing process to execute within a trusted execution area to protect its data from other processes while selectively enabling a second computing process to inspect data of the first computing process. In one example, the technology may enable a processor to establish a trusted execution area for the first computing process. The trusted execution area may be the same or similar to a trusted execution environment (TEE) and may protect the data of the first computing process from being accessed by other processes executed by the same processor. The trusted execution area may use hardware based encryption to transform the data and store the data in an encrypted storage area of a storage device (e.g., memory and/or disk device). The data of the first computing process may be received by the processor in an encrypted form and the processor may make a copy of the data before, during, or after the data is copied into the trusted execution area. The second computing process may be unable to access the data in the trusted execution area but the processor may enable the second computing process to access the stored copy of the data. Enabling the second computing process to access the stored copy of the data may involve the processor providing the second computing process with a decryption key, reconfiguring the hardware based encryption (e.g., adding second computing process to a whitelist), other technique, or a combination thereof.

Systems and methods described herein include technology that enhances the functionality of a computing device. In particular, aspects of the disclosed technology may enhance the security of the computing device by enabling a first computing process (e.g., application or VM) to reduce its attack surface by using a trusted execution area and to do so without restricting the ability of a second computing process (e.g., operating system or hypervisor) to detect whether the first computing process has been compromised or is malicious. In another aspect, the disclosed technology may enhance auditability of a computing process by enabling the kernel of the computing device to inspect data of the computing process before, during, or after the data is executed or modified. The enhanced auditability may enhance integrity, usability, and maintenance of the computer system as a whole by identifying what, where, and when the data is modified. In yet another aspect, the disclosed technology may enhance the functionality of the computing device be enabling the kernel to function as a backup key store by accessing the data (e.g., keys) of one or more computing processes.

Various aspects of the above referenced methods and systems are described in details herein below by way of examples, rather than by way of limitation. The examples provided below discuss a computing device in which a computing process uses a trusted execution area to exclude other processes from accessing data of the computing processes but explicitly enables the kernel to access the data. In other examples, a first computing process may use a trusted execution area to exclude all but a set of one or more processes from accessing its data. The set of computing processes may include a single process or multiple processes and may include a process with privileges that are lower, higher, or equal to the computing process.

Figure 1:
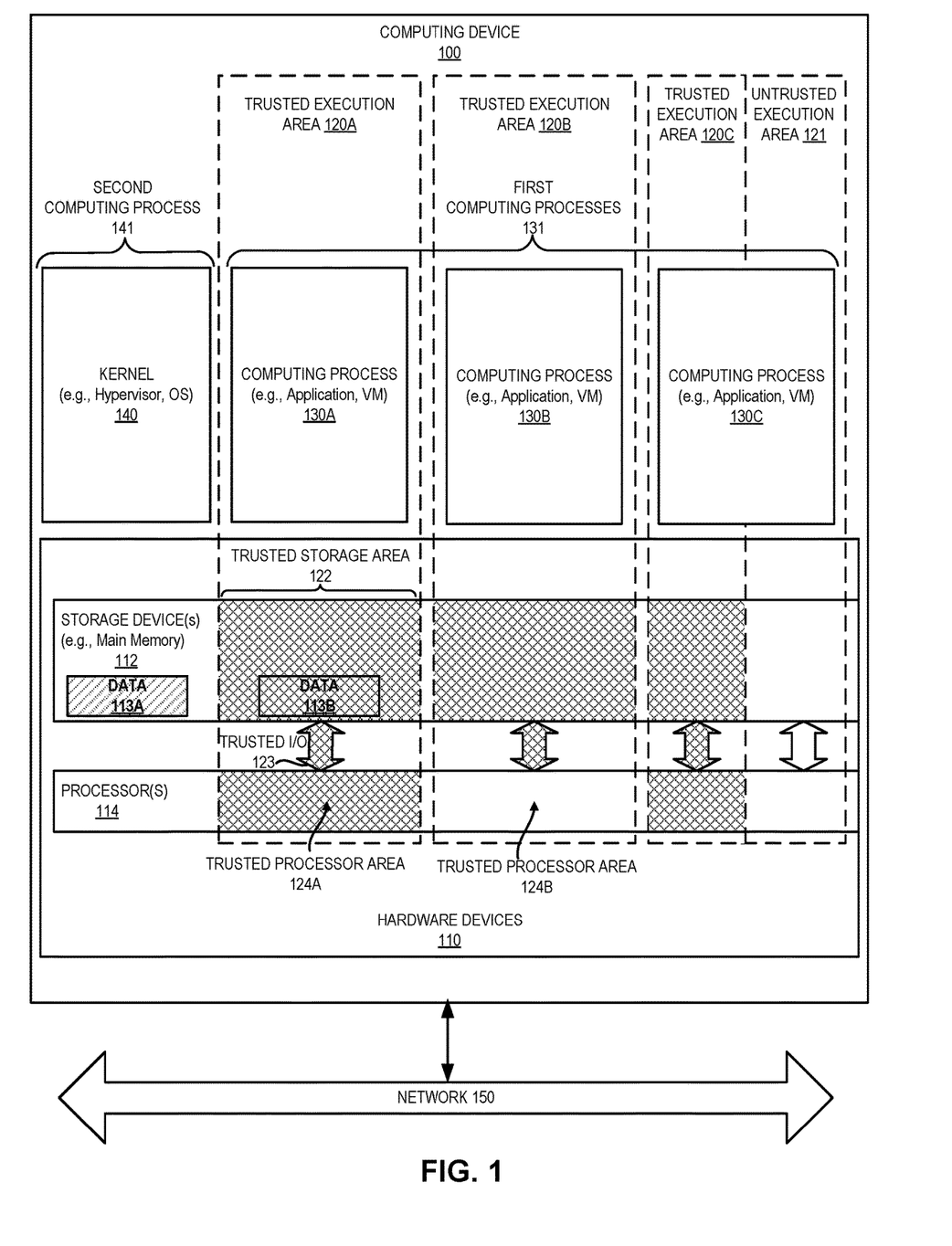
FIG. 1 depicts a high-level block diagram of an example computing device that uses a trusted execution area to guard data of a computing process, in accordance with one or more aspects of the present disclosure.

FIG. 1 depicts an illustrative architecture of elements of a computing device 100, in accordance with an embodiment of the present disclosure. Computing device 100 may include hardware devices 110, trusted execution areas 120A-C, computing processes 130A-C, kernel 140, and a network 150. It should be noted that other architectures for computing device 100 are possible, and that the implementations of the computing device utilizing embodiments of the disclosure are not necessarily limited to the specific architecture depicted.

Computing device 100 may be a single computing machine or multiple computing machines arranged in a homogenous or heterogeneous group (e.g., cluster, grid, server farm). Computing device 100 may include one or more rack mounted servers, workstations, desktop computers, notebook computers, tablet computers, mobile phones, palm-sized computing devices, personal digital assistants (PDAs), etc. In one example, computing device 100 may be a computing device implemented with x86 hardware from Intel® or AMD®. In another example, computing device 100 may be a computing device implemented with ARM®, PowerPC®, SPARC®, other hardware, or a combination thereof In either example, computing device 100 may include one or more hardware devices 110.

Hardware devices 110 may provide hardware resources for performing computing tasks. In one example, one or more of the hardware devices 110 may correspond to a physical device of computing device 100. In another example, one or more of hardware devices 110 may be provided by hardware emulation and the corresponding physical device may be absent from computing device 100. For example, computing device 100 may be a server machine that does not include a graphics device (e.g., no integrated graphics device) or includes a graphics device that does not support a particular hardware feature (e.g., 3D rendering). Kernel 140 may provide the hardware feature of the hardware device by emulating a portion of the hardware resource (e.g., provide a virtualized graphics device). The emulation of a portion of a hardware resource may be provided by kernel 140, computing process 130A-C, another hardware resource, or a combination thereof. One or more of the hardware devices 110 may be combined or consolidated into one or more physical devices or may partially or completely emulated as a virtual device. In the example in FIG. 1, hardware devices 110 may include one or more storage devices 112 and processors 114.

Storage devices 112 may include any data storage device that is capable of storing data, such as physical memory devices including volatile memory devices (e.g., RAM, DRAM, SRAM), non-volatile memory devices (e.g., NVRAM), other types of memory devices, or a combination thereof. Storage devices 112 may also or alternatively include mass storage devices, such as hard drives (e.g., Hard Disk Drives (HDD)), solid-state storage (e.g., Solid State Drives (SSD)), other persistent data storage, or a combination thereof. Storage devices 112 may be capable of storing data 113A and data 113B.

Data 113A and data 113B may be different copies of the same or similar data that is associated with one of the computing processes (e.g., 130 A). In one example, data of computing process 130A may be received from a device that is internal or external to computing device 100. The data may be encrypted using a cryptographic key that was provided (e.g., determined, derived, generated, assigned) by computing device 100 or by a different computing device. Computing device 100 may make a copy of the received data in storage device 112, as shown by data 113A. The received data may be decrypted using the same cryptographic key or a derivative of the cryptographic key and may load the decrypted data into the trusted execution area 120A, as shown by data 113B. Data 113A and data 113B are discussed in more detail in the context of computing process data 244 of FIG. 2 and may both include the same decrypted content but may be encrypted using different cryptographic keys, cryptographic functions, cryptographic techniques, or a combination thereof.

Processors 114 may be communicably coupled to storage devices 112 and be capable of executing instructions encoding arithmetic, logical, or I/O operations. Processors 114 may include one or more general processors, Central Processing Units (CPUs), Graphical Processing Units (GPUs), Application Specific Integrated Circuits (ASICs), secure cryptoprocessors, Secure Elements (SE), Hardware Security Module (HSM), other processing unit, or a combination thereof. Processors 114 may be a single core processor, which may be capable of executing one instruction at a time (e.g., single pipeline of instructions) or a multi-core processor, which may simultaneously execute multiple instructions. Processors 114 may interact with storage devices 112 to provide one or more trusted execution areas 120A-C.

Each of the trusted execution areas 120A-C may be a security enhanced area within computing device 100 that may guard the data of one or more computing processes from being accessed by other computing processes. A trusted execution area may enhance security by enhancing confidentiality (e.g., reducing unauthorized access), integrity (e.g., reduce unauthorized modifications), availability (e.g., enable authorized access), non-repudiation (e.g., action association), other aspect of digital security or data security, or a combination thereof. Each of the trusted execution areas 120A-C may be referred to as an instance of a trusted execution area (i.e., instance of a trusted execution environment (TEE)) and may be associated with and guard data of a particular execution construct. The execution construct may be a virtual machine, container, computing process, thread, instruction stream, or a combination thereof. In one example, each of the trusted execution areas 120A-C may be established for a particular virtual machine and may guard data of the virtual machine from a hypervisor managing the virtual machine. In another example, each of the trusted execution areas 120A-C may be associated with a particular computing process (e.g., user space process, application) and may guard data of the particular computing process from being access by other equally privileged, higher privileged, or lower privileged computing processes (e.g., guard against higher privileged Operating System process).

Trusted execution areas 120A-C may provide features defined by or offered by trusted execution environments (TEEs), trusted systems, trusted computing, trusted computing base (TCB), trusted platform module (TPM), hardware security module (HSM), secure element (SE), other features, or a combination thereof. A trusted execution area may be established by a set of hardware devices 110 (e.g., processor and/or storage device) that include instructions (e.g., opcodes) to initiate, configure, and maintain the trusted execution area, as discussed in more detail below in regards to FIG. 2. In one example, one or more trusted execution areas may be implemented using Software Guard eXtensions® (SGX) provided by Intel®, Memory Encryption Technology provided by AMD® (e.g., Secure Encrypted Virtualization® (SEV), Secure Memory Encryption (SME, SME-ES), TrustZone® provided by ARM®, other technology, or a combination thereof. In some or all of these examples, processors 114 may guard data using one or more trusted storage areas 122A-C.

Trusted storage area 122 may be an area of one or more storage devices 112 that stores data of a computing process. As shown in FIG. 1, trusted storage area 122 may correspond to trusted execution area 120A and may store data of computing process 130A in an encrypted form. The data may be encrypted and decrypted by hardware devices 110 using cryptographic input that includes one or more cryptographic keys. In one example, the cryptographic keys may be accessible to hardware devices 110 and may be inaccessible to operating system level processes executed by the hardware device 110. In another example, the cryptographic keys may be accessible to hardware devices 110 and one or more computing processes, such as, the computing process associated with the trusted execution area. In either example, the encryption and decryption performed by the hardware device may be referred to as hardware based encryption, hardware level encryption, hardware assisted encryption, hardware enforced encryption, other term, or a combination thereof.

Trusted storage area 122 may include a portion of memory and may be referred to as an encrypted memory area. An encrypted memory area may be a contiguous or non-contiguous portion of virtual memory, logical memory, physical memory, other storage abstraction, or a combination thereof. The encrypted memory area may correspond to or be mapped to a portion of primary memory (e.g., main memory), auxiliary memory (e.g., solid state storage), adapter memory (e.g., memory of graphics card), other persistent or non-persistent storage, or a combination thereof. In one example, the encrypted memory area may be a portion of main memory associated with a particular process and the processor may encrypt the data when storing the data in the memory area and may decrypt the data when retrieving the data from the memory area. The data in the memory area may be transformed (e.g., encrypted or decrypted) before, during, or after it is stored in or retrieved from the memory area and may remain in an encrypted form while in the encrypted memory area.

Trusted storage area 122 may store the data in one or more storage units. The storage units may be logical or physical units of data storage for managing the data (e.g., storing, organizing, or accessing the data). A storage unit may include a contiguous or non-contiguous sequence of bytes or bits. In one example, a storage unit may be a virtual representation of underlying physical storage units, which may be referred to as physical storage blocks. Storage units may have a unit size that is the same or different from a physical block size provided by an underlying hardware resource. The storage unit may include volatile or non-volatile data storage. In one example, storage units may be a memory segment and each memory segment may correspond to an individual memory page, multiple memory pages, or a portion of a memory page. In other examples, each of the storage units may correspond to a portion (e.g., block, sector) of a mass storage device (e.g., hard disk storage, solid state storage). The data in the storage units of trusted storage area 122 may be transmitted to other hardware devices using trusted IO 123.

Trusted IO 123 may enable the data of a computing process to be transmitted between hardware devices 110 in a security enhanced manner. The data may be transmitted over one or more system buses, networks, or other communication channel in an encrypted or partially encrypted form. This may be advantageous because transmitting the data in an encrypted form may limit the ability of the data to be snooped while being transmitted between hardware devices. As shown in FIG. 1, trusted IO 123 may enable the data of computing process 130A to be transmitted between trusted storage area 122 and trusted processor area 124A.

Trusted processor area 124A may be a portion of processor 114 that is associated with computing process 130A and guards data of computing process 130A from being accessed or modified by computing processes 130B-C. Trusted processor area 124A may include a portion of processor 114 that stores the data (e.g., CPU cache, processor memory or registers) and a portion of processor 114 that executes the data (e.g., processor core). A trusted processor area may store the data in an encrypted form as shown by trusted processor area 124A or in a decrypted form as shown by trusted processor area 124B. In either example, the data of a computing process may be protected from being accessed or modified by other processes via the design of the processor and encryption may not be required to ensure isolation of the data when the data is within the processor packaging (e.g., chip packaging).

As shown in FIG. 1, the same processor and storage device may be used to establish multiple instances of a trusted execution area (e.g., trusted execution areas 120A-C). Each instance may be established for a particular set of one or more computing processes and may be associated with a particular memory encrypted area. The instances of a trusted execution area may be provided by the same hardware (e.g., processor and memory) but each instance may be associated with a different memory encrypted area and a different set of one or more processes (e.g., set including an individual process or set of all VM processes).

Each instance may guard all data of a computing process or a portion of the data of a computing process. For example, computing process 130A (e.g., application or VM) may be associated with both a trusted execution area (e.g., 120C) and an untrusted execution area (e.g., 121). In this situation, a first portion of the data of computing process 130C may be stored and/or executed within trusted execution area 120C and a second portion of the data of computing process 130C may be stored and/or executed within the untrusted execution area 121. The second portion may be stored in the same storage device as the first portion but the second portion may be stored in a decrypted form and may be executed by processor 114 in a manner that enables another process (e.g., multiple higher privileged processes) to access or modify the data. In either example, trusted execution area may be used to execute one or more of the computing processes 130A-C.

Each of the computing processes 130A-C may include one or more streams of execution for executing programmed instructions. A stream of instructions may include a sequence of instructions that can be executed by one or more processors. Each of the computing processes may be managed by a kernel 140 or may be a part of kernel 140 (not shown). In one example, a computing process may be an instance of a computer program that is being executed and may contain executable program code and a state of the current activity. Multiple computing processes may be executed concurrently by a processing device that supports multiple processing units. The processing units may be provided by multiple processors or from a single processor with multiple cores or a combination thereof. A computing process may include one or more computing threads, such as a system thread, user thread, or fiber, or a combination thereof. A computing process may include a thread control block, one or more counters and a state (e.g., running, ready, waiting, start, done).

Computing processes 130A-C may be examples of first computing processes 131 and may correspond to one or more applications, containers, virtual machines, or a combination thereof. Applications may be programs executing with user space privileges and may be referred to as application processes, system processes, services, background processes, or user space processes. A user space process (e.g., user mode process, user privilege process) may have lower level privileges that provide the user space process access to a user space portion of data storage without having access to a kernel space portion of data storage. In contrast, a kernel process may have higher privileges that provide the kernel process access to a kernel space portion and to user space portions that are not guarded by a trusted execution area. In one example, the privilege associated with a user space process may change during execution and a computing process executing in user space (e.g., user mode, user land) may be granted enhanced privileges by an operating system and function in kernel space (e.g., kernel mode, kernel land). This may enable a user space process to perform an operation with enhanced privileges. In another example, the privilege associated with a user space process may remain constant during execution and the user space process may request an operation be performed by another computing process that has enhanced privileges (e.g., operating in kernel space).

The privilege levels of a computing process may be the same or similar to protection levels of processor 114 (e.g., processor protection rings) and may indicate an access level of a computing process to hardware resources (e.g., virtual or physical resources). There may be multiple different privilege levels assigned to the computing process. In one example, the privilege levels may correspond generally to either a user space privilege level or a kernel privilege level. The user space privilege level may enable a computing process to access resources assigned to the computing process but may restrict access to resources assigned to another user space or kernel space computing process. The kernel space privilege level may enable a computing process to access resources assigned to other kernel space or user space computing processes. In another example, there may be a plurality of privilege levels, and the privilege levels may include a first level (e.g., ring 0) associated with a kernel, a second and third level (e.g., ring 1-2) associated with device drivers, and a fourth level (e.g., ring 3) that may be associated with user applications.

Kernel 140 may include one or more programs that are run to manage one or more of the computing processes 130A-C. Kernel 140 may execute as one or more kernel processes and manage access to physical or virtual resources provided by hardware devices 110. A kernel process may be an example of a second computing process 141, which may be a computing process that is associated with a higher privilege level (e.g., hypervisor privilege, kernel privilege, kernel mode, kernel space, protection ring 0). In one example, kernel 140 may be an operating system or part of an operating system (e.g., OS, host OS, guest OS) and the computing processes 130A-C may be different applications that are executing as user space processes. In another example, kernel 140 may be a hypervisor that provides hardware virtualization features and the computing processes 130A-C may be different virtual machines. In yet another examples, kernel 140 may include a container runtime (e.g., Docker, Container Linux) that provides operating system level virtualization and the computing processes 130A-C may be different containers. In further examples, kernel 140 may provide a combination thereof (e.g., hardware virtualization and operating system level virtualization).

Kernel 140 may segregate storage devices 112 (e.g., main memory, hard disk) into multiple portions that are associated with different access privileges. At least one of the multiple portions may be associated with enhanced privileges and may be accessed by processes with enhanced privileges (e.g., kernel mode, kernel privilege) and another portion may be associated with diminished privileges and may be accessed by processes with both diminished privileges (e.g., user space mode, user space privilege) and those with enhanced privileges. In one example, the portion of storage devices 112 associated with the enhanced privileges may be designated as kernel space and the portion of storage devices 112 associated with the diminished privileges may be designated as user space. In other examples, there may be more or less than two portions.

When kernel 140 provides features of a hypervisor it may also be known as a virtual machine monitor (VMM) and may provide virtual machines with access to one or more features of the underlying hardware devices 110. A hypervisor may run directly on the hardware of computing device 100 (e.g., host machine) or may run on or within a host operating system (not shown). The hypervisor may manage system resources, including access to hardware devices 110. The hypervisor may be implemented as executable code and may emulate and export a bare machine interface to higher-level executable code in the form of virtual processors and guest memory. Higher-level executable code may comprise a standard or real-time operating system (OS), may be a highly stripped down operating environment with limited operating system functionality and may not include traditional OS facilities, etc.

Figure 2:
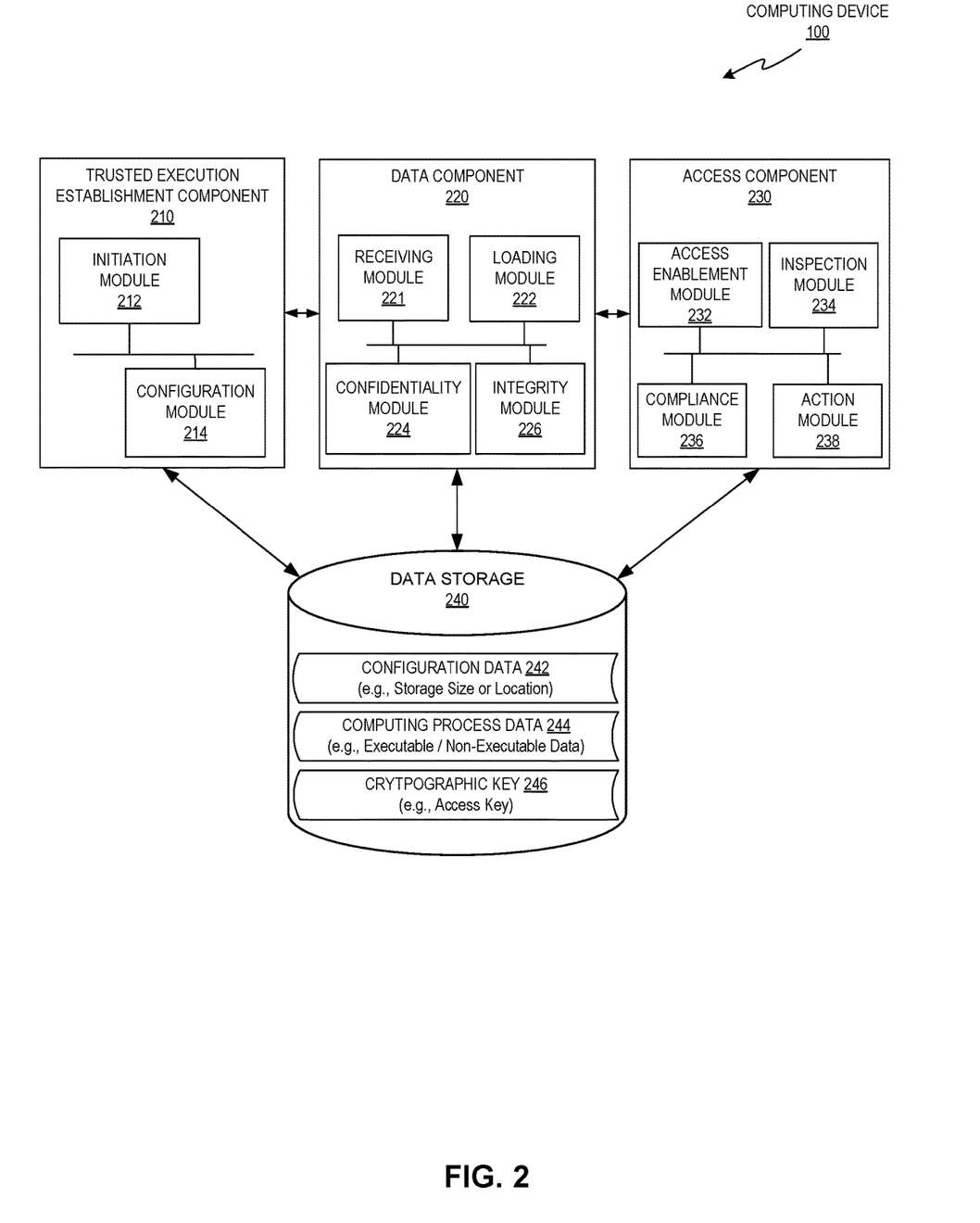
FIG. 2 depicts a block diagram of an example computing device with one or more components and modules, in accordance with one or more aspects of the present disclosure.

FIG. 2 depicts a block diagram illustrating an exemplary computing device 100 that includes technology that uses a trusted execution area to protect data of a computing process, in accordance with one or more aspects of the present disclosure. Computing device 100 may be the same or similar to computing device 100 of FIG. 1 and may include a trusted execution establishment component 210, a data component 220, a access component 230, and data storage 240. The components and modules discussed herein may be performed by any portion of a computing device. For example, one or more of the components or modules discussed below may be performed by processor hardware, processor firmware, a kernel, a driver, an application, other portion of an operating system, or a combination thereof.

More or less components or modules may be included without loss of generality. For example, two or more of the components may be combined into a single component, or features of a component may be divided into two or more components. In one implementation, one or more of the components may reside on different computing devices (e.g., on processor and memory controller).

Trusted execution establishment component 210 enables computing device 100 to establish one or more trusted execution areas for the computing processes executing on computing device 100. Establishing a trusted execution area may involve creating a new trusted execution environment or updating an existing trusted execution environment. Each trusted execution area may be associated with one or more computing processes and may store or execute data of set of the one or more computing processes. In one example, trusted execution establishment component 210 may include an initiation module 212 and a configuration module 214.

Initiation module 212 may enable computing device 100 to initiate the configuration of a trusted execution area by executing one or more instructions recognized by the processor (e.g., Intel SGX opcodes). The instructions may be called by a program associated with an application, operating system, hypervisor, BIOS, hardware adapter, other entity, or a combination thereof. In one example, a computing process may initiate the creation of the trusted execution area and may subsequently execute within the trusted execution area. In another example, a computing processes may initiate the creation of the trusted execution area and the trusted execution area may be used for another computing process. In either example, after the trusted execution area is initiated it may be configured by configuration module 214.

Configuration module 214 may enable computing device 100 to configure a trusted execution area to store or execute data of a computing process. Configuration module 214 may configure the trusted execution area in view of configuration data 242 that may be provided by a process initiating or using the trusted execution area, by a processor, storage device, other portion of computing device 100, or a combination thereof. Configuration data 242 may be provided as input before, during, or after the trusted execution area is initiated, created, or updated. As discussed above, a trusted execution area may include a trusted storage area, a trusted processor area, trusted IO, or a combination thereof and the configuration data 242 may include data for configuring one or more of these. For example, configuration data 242 may include an execution construct data (e.g., processes identifier (PID), virtual machine identifier (UUID)), a storage data (e.g., storage size or location), cryptographic data (e.g., encryption key, decryption key, seed, salt, nonce), other data, or a combination thereof. One or more of these may be configured or customize and associated with the trusted execution area for the computing process. In one example, the trusted execution area may include an encrypted storage area and the configuration data 242 may indicate a size of the encrypted storage area that will be allocated to store the computing processes (e.g., size of virtual memory for a trusted storage area).

Configuration module 214 may configure different aspects of the trusted execution area to use different cryptographic techniques. The different cryptographic techniques may use different cryptographic functions, cryptographic settings, cryptographic keys, cryptographic inputs, other cryptographic data, or a combination thereof. In one example, data of a computing process may be encrypted using a first cryptographic technique (e.g., encrypted using a transport key) when loaded by the processor and may be encrypted using a second cryptographic technique (e.g., encrypted using a storage key) when stored in the encrypted storage area. This may be advantageous because the data may be more vulnerable to attack when it is stored on a removable storage device (e.g., memory module) then when it is transferred over the system bus and therefore a different cryptographic technique may be used.

Data component 220 may enable computing device 100 to load data of a computing processes to enhance the confidentiality and integrity of the data. The data of a computing process may be stored in data storage 240 as computing process data 244. Computing process data 244 may include executable data (e.g., machine code, instruction calls, opcodes), non-executable data (e.g., configuration data, parameter values, settings files), other data, or a combination thereof. In one example, data component 220 may include a receiving module 221, a loading module 222, a confidentiality module 224, and an integrity module 226.

Receiving module 221 may enable computing device 100 to receive computing process data 244 and store it in data storage 240. Receiving module 221 may receive computing process data 244 from one or more devices. In one example, receiving module 221 may receive computing process data 244 from an external device (e.g., remote client device) that is accessible over an external connection (e.g., network, interne, ethernet, or cellular connection) using a network adapter. The network adapter may write the data directly to data storage 240 (e.g., Direct Memory Access (DMA)) or may provide the data to the processor and the processor may write the data to data storage 240. In another example, receiving module 221 may receive computing process data 244 from an internal device (e.g., hard drive) that is accessible over an internal connection (e.g., internal data bus). In either example, receiving module 221 may store one or more copies of computing process data 244.

Loading module 222 may include instructions for loading computing process data 244 into a trusted execution area. Loading computing process data 244 may involve copying data, moving data, updating data, modifying data, or other action affecting data of a computing process. The process of loading computing process data 244 may involve copying data into the trusted processor area from the trusted storage area, copying data into the trusted storage area from an untrusted area, other copy operation, or a combination thereof. The trusted execution area may store the data of the computing process in the encrypted storage area and the loading may involve the processor receiving the data in an encrypted form over a bus from the encrypted storage area (e.g., retrieving data via trusted IO). The trusted execution area may be a trusted execution environment (TEE) that includes or is associated with a portion of memory and a portion of the processor and wherein the data of the computing process that is loaded into the trusted execution area may be accessible to the computing process and inaccessible to the kernel prior to the enabling.

Integrity module 226 may use the trusted execution area to enhance the integrity of computing process data 244. Data integrity may involve avoiding unauthorized changes to the data by maintaining and assuring the accuracy and consistency of the computing process data 244 during storage, retrieval, execution, or a combination thereof. Enhancing data integrity may be the same or similar to enhancing data quality or data validation and may reduce data corruption. Integrity module 226 may check the integrity of computing process data 244 and therefore the integrity of computing device 100. The check may be done before, during, or after the trusted execution area is established (e.g., attest in response to the initiation and before configuring).

Integrity module 226 may provide attestation to enhance data integrity. Attestation may enable a computing device to detect unauthorized changes to programs, hardware devices, other portions of computing device, or a combination thereof. The unauthorized changes may be the result of malicious, defective, or accidental actions by a program or hardware device. Attestation may involve local attestation where the data integrity is being verified by a portion of computing device 100 or remote attestation where the data integrity is being verified by another computing device (e.g., over network 150). In either example, the attestation may be performed non-anonymously or anonymously (e.g., Direct Anonymous Attestation (DAA)). Integrity module 226 may enhance data integrity using one or more features of confidentiality module 224.

Confidentiality module 224 may enable computing device 100 to enhance the confidentiality of computing process data 244. Enhancing the confidentiality of computing process data 244 may be the same or similar to enhancing the security of computing process data 244 by reducing access to the data by other computing processes, hardware devices, or a combination thereof. Confidentiality module 224 may implement the trusted storage area as an encrypted storage area that uses hardware based encryption. The encrypted storage area may be a contiguous portion of virtual memory of the computing process and the hardware based encryption may be provided by a central processing unit, memory device, other hardware device, or a combination thereof. The hardware based encryption may cause other computing processes to be unable to access content of the virtual memory of the computing process or to limit access to an encrypted version of the content in the virtual memory. Confidentiality module 224 may enable confidentiality to be waived or customized so that one or more other computing processes (e.g., a kernel process) can access a decrypted version of computing process data 244. Waiving confidentiality is discussed in more detail in regards to access component 230 and may be performed without waiving data integrity (e.g., data can be selectively accessed but not modified).

Access component 230 may enable computing device 100 to use a trusted execution area to reduce access to data of a first computing process without restricting the ability of a second computing process (e.g., management process) to inspect the data of the first computing process. In one example, the first computing process may be a user space process and the second computing process may be a part of an operating system that manages the user space process. In another example, the first computing process may be a set of computing processes of a virtual machine and the second computing process may be a part of an operating system or hypervisor that manages the virtual machine. In either example, access component 230 may include an access enablement module 232, an inspection module 234, a compliance module 236, and an action module 238.

Access enablement module 232 may be used to enable a second computing process (e.g., kernel process) to access data of the first computing process that is in the trusted execution area. The trusted execution area may be configured to protect data of the first computing process from all other computing processes but receiving module 221 may have made a copy of an encrypted version of the computing process data 244 and stored it in a location outside of the trusted execution area. In one example, access enablement module 232 may enable the second computing process to access the copy of the computing process data 244 by providing the second computing process with access to a cryptographic key 246. Cryptographic key 246 may be used as a decryption key, authentication key, access key, other key, or a combination thereof. The cryptographic key 246 may be the same key that was used to encrypt the computing process (e.g., symmetric key) or may be a mathematically related cryptographic key (e.g., asymmetric key, private key, public key). In another example, access enablement module 232 may enable the kernel to access computing process data 244 by adding information of a kernel processes to an access list (e.g., white list, black list). For example, a data structure of the processor may be updated to include a process identifier of the second computing process and the underlying hardware may perform the decryption. In either example, access enablement module 232 may update computing device 100 to enable the second computing process to access computing process data 244 before, during, or after the computing process data 244 is executed or accessed by the processor.

Inspection module 234 may enable the second computing process to inspect the stored copy of computing process data 244. As discussed above, the second computing process may be part of a kernel, which may include one or more programs that execute as one or more kernel processes. Each kernel process may be a computing process that is associated with a higher privilege level (e.g., kernel privilege, kernel mode, kernel space, protection ring 0). In one example, the higher level privilege may enable the kernel process to access the copy of the computing process data 244 while it is in an encrypted form and the kernel may use cryptographic key 246 to decrypt the encrypted computing process data 244. In another example, the kernel process may attempt to access computing process data 244 and a hardware device may compare the kernel process identification information (e.g., PID) with one or more approved or disapproved process identifiers (e.g., white list or black list). In response to the comparison, the hardware device may provide the kernel process with access to the computing process data 244. The kernel process may then receive computing process data 244 before, during, or after the computing process data 244 is decrypted by one of the hardware devices. The kernel process may or may not be aware that the computing process data 244 was previously encrypted and decrypted. In either example, the kernel may access the unencrypted version of computing process data 244 and make it available to compliance module 236.

Compliance module 236 may enable the second computing process to determine whether computing process data 244 is in compliance with one or more rules. Determining whether the data complies with the rules may be the same or similar to detecting compliance or performing a compliance inquiry and may involve analyzing and evaluating computing process data 244 to detect compliance or incompliance. The analysis may be static analysis, dynamic analysis, or a combination thereof. The static analysis may analyze and evaluate computing process data 244 while it is stored in data storage (e.g., anywhere in hierarchy of memory). Dynamic analysis may analyze and evaluate computing process data 244 while it is being executed by one or more processor cores (e.g., during runtime). The rules may be based on predetermined data (e.g., list of predetermined rules), machine learning data (e.g., machine learning model), other data, or a combination thereof.

The rules may include security rules, execution rules, other rules, or a combination thereof. Determining compliance in view of security rules may be the same or similar to evaluating antivirus rules and may involve detecting patterns of data that may correspond to malicious data (e.g., malicious executable code or configurations). Determining compliance in view of execution rules may involve detecting whether the computing process data 244 includes capabilities for loading other code after computing process data 244 starts to execute. This may be referred to as dynamic linking or dynamic loading and may be detected performed before, during, or after initiation or runtime (e.g., dynamic linked libraries, dynamically loadable modules).

Action module 238 may enable computing device 100 to take an action in response to determining whether or not the computing process data 244 is compliant. The action may be referred to as a compliance response and may be initiated or performed by the second computing process, by a kernel (e.g., hypervisor, OS), computing process (application, VM), hardware device (processor, memory device), other portion of computing device 100, or a combination thereof. The action may involve modifying the execution of the computing process by pausing, limiting, suspending, or terminating the execution of the non-compliant computing process. The action may also or alternatively involve providing a signal corresponding to the compliance (e.g., a compliance signal or uncompliant signal). Providing the signal may involve updating a shared storage location (e.g., shared memory or processor registry) or transmitting the signal to one or more computing devices. The signal may be transmitted internal to computing device 100 over an internal bus or transmitted external to computing device 100 to another computing device over network 150.

Figure 3:
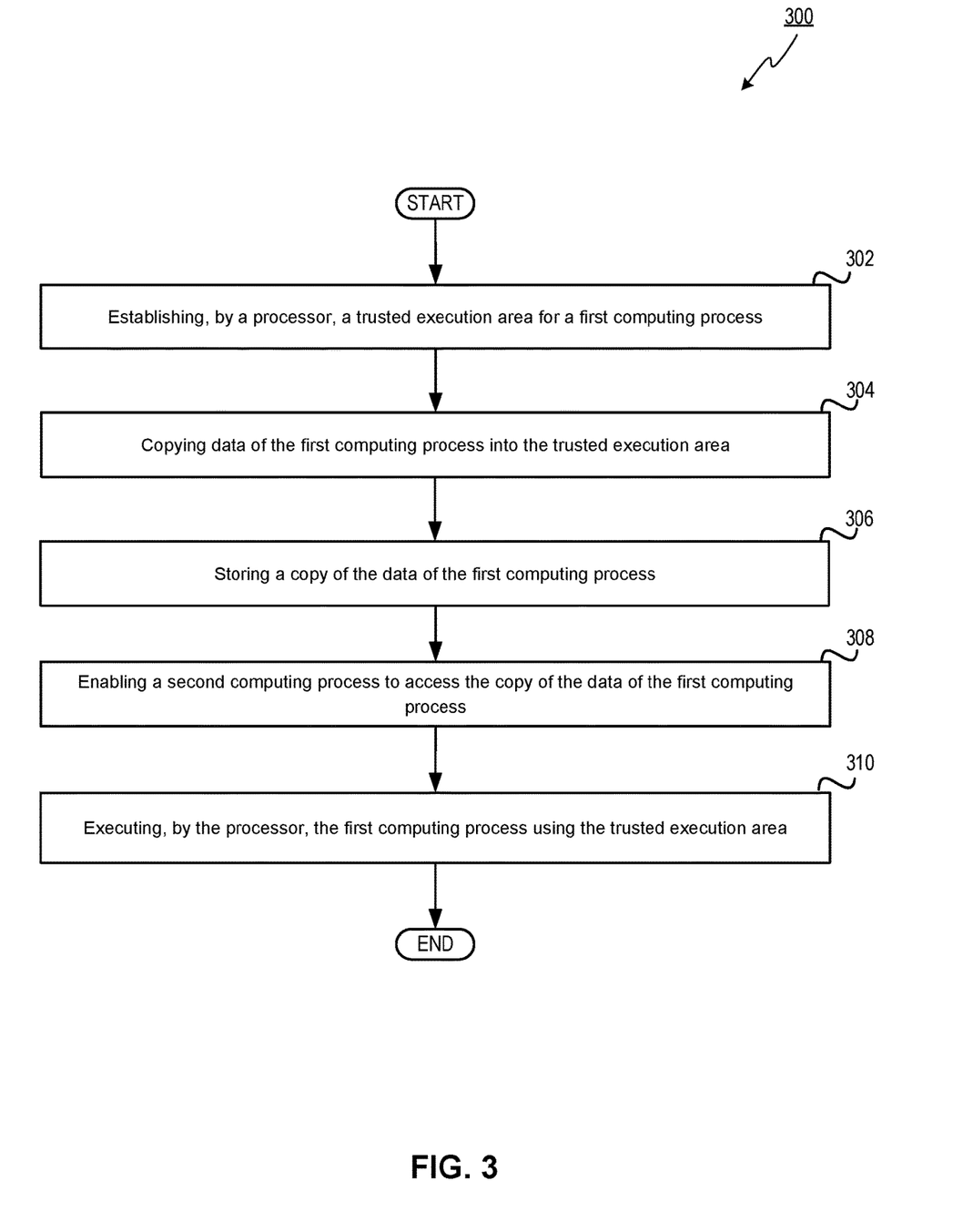
FIG. 3 depicts a flow diagram of an example method for enabling a kernel to inspect data of a computing process that is using a trusted execution area, in accordance with one or more aspects of the present disclosure.
Figure 4:
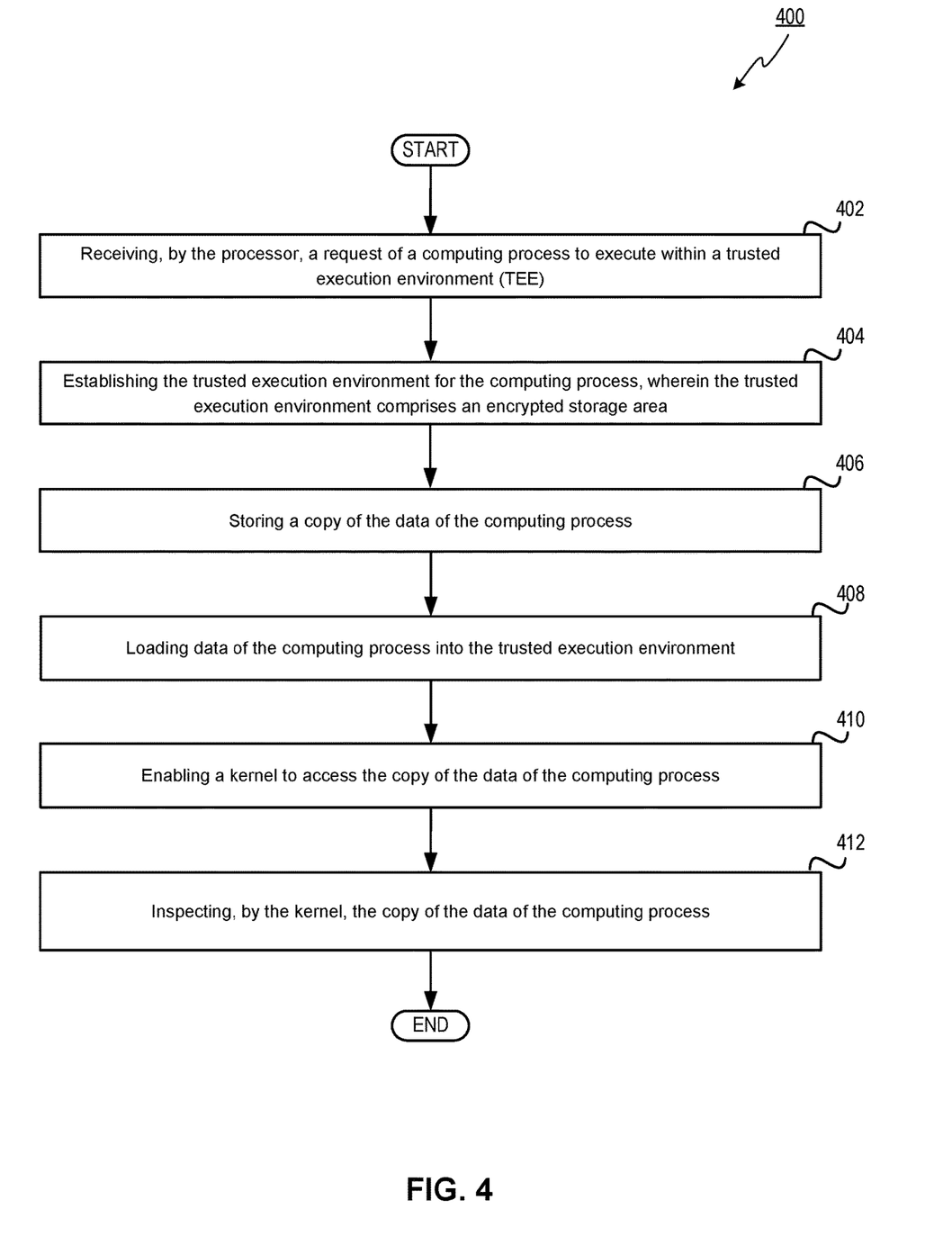
FIG. 4 depicts a flow diagram of another example method for enabling a kernel to inspect data of a computing process that is using a trusted execution area, in accordance with one or more aspects of the present disclosure.

FIGS. 3 and 4 depict flow diagrams for illustrative examples of methods 300 and 400 for configuring a trusted execution area to guard data of a computing process from all but a select few processes that have been granted access to the guarded data. Methods 300 and 400 may be performed by processing devices that may comprise hardware (e.g., circuitry, dedicated logic, programmable logic, microcode, etc.), executable code (such as is run on a general purpose computer system or a dedicated machine), or a combination of both. Methods 300 and 400 and each of their individual functions, routines, subroutines, or operations may be performed by one or more processors of the computing device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processes implementing methods 300 and 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed computing device 100 shown in FIGS. 1 and 2.

Referring to FIG. 3, method 300 may be performed by a processor of a server device or a client device and may begin at block 302. At block 302, the processor may establish a trusted execution area for a first computing process and the trusted execution area may include an encrypted storage area. The encrypted storage area may include a contiguous or non-continuous portion of virtual memory of the first computing process. In one example, the trusted execution area may be a trusted execution environment (TEE) that includes a portion of memory (e.g., trusted storage area) and a portion of the processor (e.g., trusted processor area).

At block 304, the processor may copy data of the first computing process into the trusted execution area. The data of the first computing process that is copied or loaded into the trusted execution area may be accessible by the first computing process and inaccessible to a second computing process that is managing the first computing process. In one example, the processor may transmit a cryptographic key (e.g., symmetric transport key) to a device over a network and may receive from the device the data of the first computing process. The data of the first computing process may be encrypted using the cryptographic key, decrypted using the cryptographic key, or a combination thereof. The cryptographic key may be received from the device before, during, or after the encrypted data is received.

The trusted execution area may store the data of the first computing process in the encrypted storage area and the copying of the data may involve the processor receiving the data in an encrypted form over a bus from the encrypted storage area. In one example, the data of the firs computing process may be encrypted using a first key when stored in the encrypted storage area and may be encrypted using a second key when copied or loaded by the processor.

At block 306, the processor may store a copy of the data of the first computing process. The copy of the data may be encrypted and may include the same underlying decrypted content that will be loaded into the trusted execution area. The copy of the data may be stored in a storage device and at a storage location that is accessible to a second computing process. The stored copy of the data may be encrypted using a first cryptographic key (e.g., transport key, location independent key) and the data in the trusted execution area may be encrypted using a second cryptographic key (e.g., location dependent key).

At block 308, the processor may enable the second computing process (e.g., kernel process) to access the copy of the data of the computing process. Enabling the second computing process to access the copy of the data may waive data confidentiality without waiving data integrity of the data stored in the trusted execution area. In one example, the first computing process may be an application process and the second computing process may be a kernel process that manages the application process. The data in the trusted execution area may be accessible to the application process and inaccessible to the kernel process. In another example, the first computing process may be a virtual machine process of a virtual machine and the second computing process may be a hypervisor process that manages the virtual machine. The data in the trusted execution area may be accessible to the virtual machine and inaccessible to the hypervisor. In either example, enabling the second computing process to access the copy of the data of the first computing process may involve the second computing process being provided a cryptographic key that enables the second computing process to decrypt the stored copy of the data.

At block 310, the processor may execute the data of the computing process using the trusted execution area. In one example, the second computing process may inspect the copy of the data of the first computing process and determine in view of the inspection that the data of the first computing process in the trusted execution area includes non-malicious executable code. The determination may be done before, during, or after the data is loaded or began executing.

Responsive to completing the operations described herein above with references to block 310, the method may terminate.

Referring to FIG. 4, method 400 may be performed by processing devices of a server device or a client device and may begin at block 402. At block 402, the processing device may receive a request of a computing process to execute within a trusted execution environment (TEE). The request may include configuration data that identifies an attribute of the trusted execution environment.

At block 404, the processor may establish a trusted execution environment for a computing process and the trusted execution environment may include an encrypted storage area. The encrypted storage area may include a contiguous or non-continuous portion of virtual memory of the first computing process. In one example, the trusted execution environment includes a portion of memory (e.g., trusted storage area) and a portion of the processor (e.g., trusted processor area).

At block 406, the processor may store a copy of the data of the computing process. The copy of the data may be encrypted and may include the same underlying decrypted content that will be loaded into the trusted execution environment. The copy of the data may be stored in a storage device and at a storage location that is accessible to a kernel (e.g., operating system process or hypervisor process). The stored copy of the data may be encrypted using a first cryptographic key (e.g., transport key, location independent key) and the data in the trusted execution environment may be encrypted using a second cryptographic key (e.g., location dependent key).

At block 408, the processor may copy data of the computing process into the trusted execution environment. The data of the computing process that is copied or loaded into the trusted execution environment may be accessible by the computing process and inaccessible to a kernel managing the computing process. In one example, the processor may transmit a cryptographic key (e.g., symmetric transport key) to a device over a network and may receive from the device the data of the computing process. The data of the computing process may be encrypted using the cryptographic key, decrypted using the cryptographic key, or a combination thereof. The cryptographic key may be received from the device before, during, or after the encrypted data is received.

The trusted execution environment may store the data of the computing process in the encrypted storage area and the copying of the data may involve the processor receiving the data in an encrypted form over a bus from the encrypted storage area. In one example, the data of the computing process may be encrypted using a first key when stored in the encrypted storage area and may be encrypted using a second key when copied or loaded by the processor.

At block 410, the processor may enable the kernel (e.g., operating system or hypervisor) to access the copy of the data of the computing process. Enabling the kernel to access the copy of the data may waive data confidentiality without waiving data integrity of the data stored in the trusted execution environment. In one example, the computing process may be an application process and the kernel may be a kernel process that manages the application process. The data in the trusted execution environment may be accessible to the application process and inaccessible to the kernel process. In another example, the first computing process may be a virtual machine process of a virtual machine and the second computing process may be a hypervisor process that manages the virtual machine. The data in the trusted execution environment may be accessible to the virtual machine and inaccessible to the hypervisor. In either example, enabling the kernel to access the copy of the data of the computing process may involve the kernel being provided a cryptographic key that enables the kernel process to decrypt the stored copy of the data.

At block 412, the processor may execute the data of the computing process using the trusted execution environment. In one example, the kernel may inspect the copy of the data of the computing process and determine in view of the inspection that the data of the computing process in the trusted execution environment includes non-malicious executable code. The determination may be done before, during, or after the data is loaded or began executing. Responsive to completing the operations described herein above with references to block 412, the method may terminate.

Figure 5:
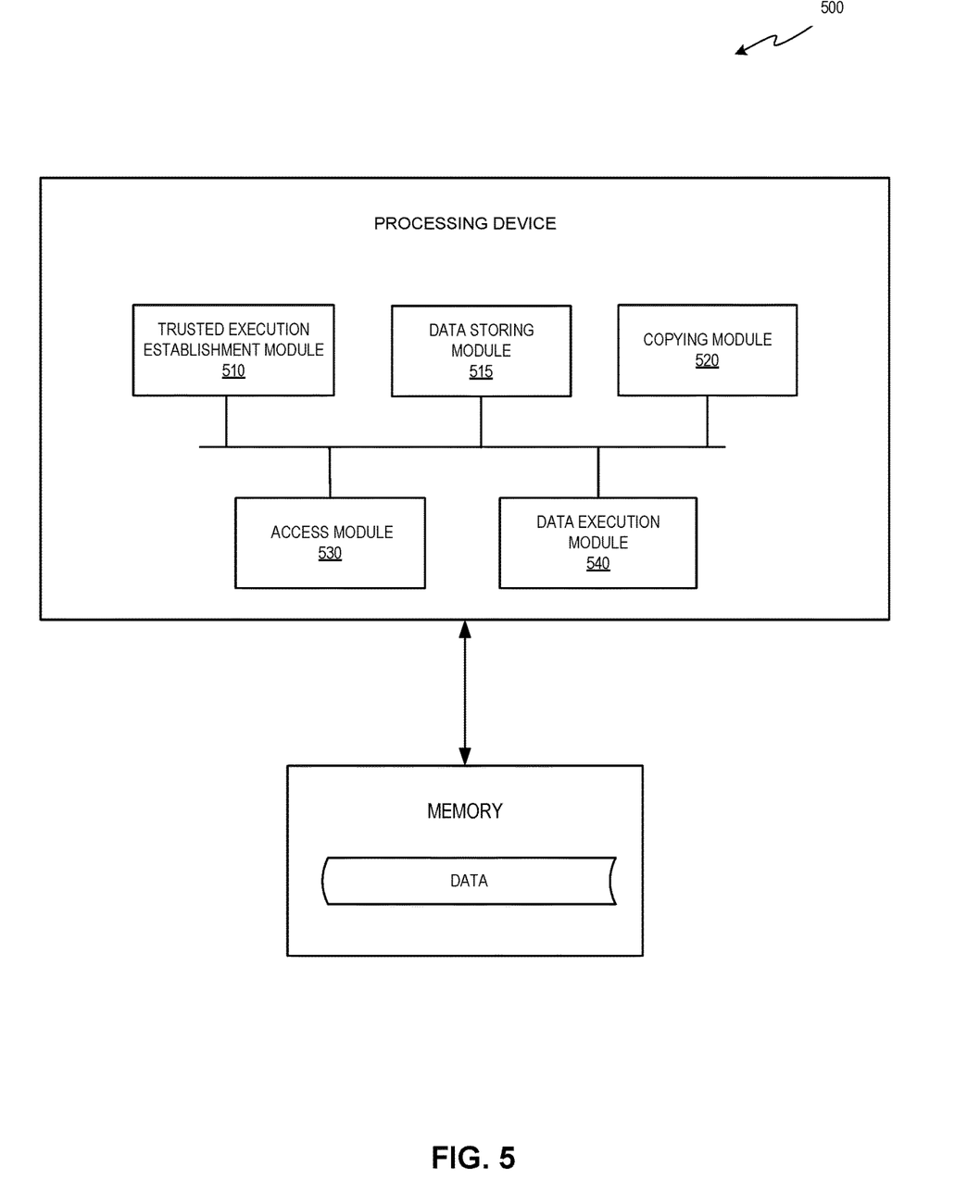
FIG. 5 depicts a block diagram of an example computer system in accordance with one or more aspects of the present disclosure.

FIG. 5 depicts a block diagram of a computer system 500 operating in accordance with one or more aspects of the present disclosure. Computer system 500 may be the same or similar to computing device 100 of FIG. 1 or 2, and may include one or more processors and one or more memory devices. In the example shown, computer system 500 may include a trusted execution establishment module 510, a data storing module 515, a copying module 520, an access module 530, and a data execution module 540.

Trusted execution establishment module 510 may enable a processor to establish a trusted execution area for a first computing process and the trusted execution area may include an encrypted storage area. The encrypted storage area may include a contiguous or non-continuous portion of virtual memory of the first computing process. In one example, the trusted execution area may be a trusted execution environment (TEE) that includes a portion of memory (e.g., trusted storage area) and a portion of the processor (e.g., trusted processor area).

Data storing module 515 may enable the processor to store a copy of the data of the first computing process. The copy of the data may be encrypted and may include the same underlying decrypted content that will be loaded into the trusted execution area. The copy of the data may be stored in a storage device and at a storage location that is accessible to a second computing process. The stored copy of the data may be encrypted using a first cryptographic key (e.g., transport key, location independent key) and the data in the trusted execution area may be encrypted using a second cryptographic key (e.g., location dependent key).

Copying module 520 may enable the processor to copy data of the first computing process into the trusted execution area. The data of the first computing process that is copied or loaded into the trusted execution area may be accessible by the first computing process and inaccessible to a second computing process that is managing the first computing process. In one example, the processor may transmit a cryptographic key (e.g., symmetric transport key) to a device over a network and may receive from the device the data of the first computing process. The data of the first computing process may be encrypted using the cryptographic key, decrypted using the cryptographic key, or a combination thereof. The cryptographic key may be received from the device before, during, or after the encrypted data is received.

The trusted execution area may store the data of the first computing process in the encrypted storage area and the copying of the data may involve the processor receiving the data in an encrypted form over a bus from the encrypted storage area. In one example, the data of the firs computing process may be encrypted using a first key when stored in the encrypted storage area and may be encrypted using a second key when copied or loaded by the processor.

Access module 530 may cause the processor to enable the second computing process (e.g., kernel process) to access the copy of the data of the computing process. Enabling the second computing process to access the copy of the data may waive data confidentiality without waiving data integrity of the data stored in the trusted execution area. In one example, the first computing process may be an application process and the second computing process may be a kernel process that manages the application process. The data in the trusted execution area may be accessible to the application process and inaccessible to the kernel process. In another example, the first computing process may be a virtual machine process of a virtual machine and the second computing process may be a hypervisor process that manages the virtual machine. The data in the trusted execution area may be accessible to the virtual machine and inaccessible to the hypervisor. In either example, enabling the second computing process to access the copy of the data of the first computing process may involve the second computing process being provided a cryptographic key that enables the second computing process to decrypt the stored copy of the data.

Data execution module 540 may enable the processor to execute the data of the computing process using the trusted execution area. In one example, the second computing process may inspect the copy of the data of the first computing process and determine in view of the inspection that the data of the first computing process in the trusted execution area includes non-malicious executable code. The determination may be done before, during, or after the data is loaded or began executing.

Figure 6:
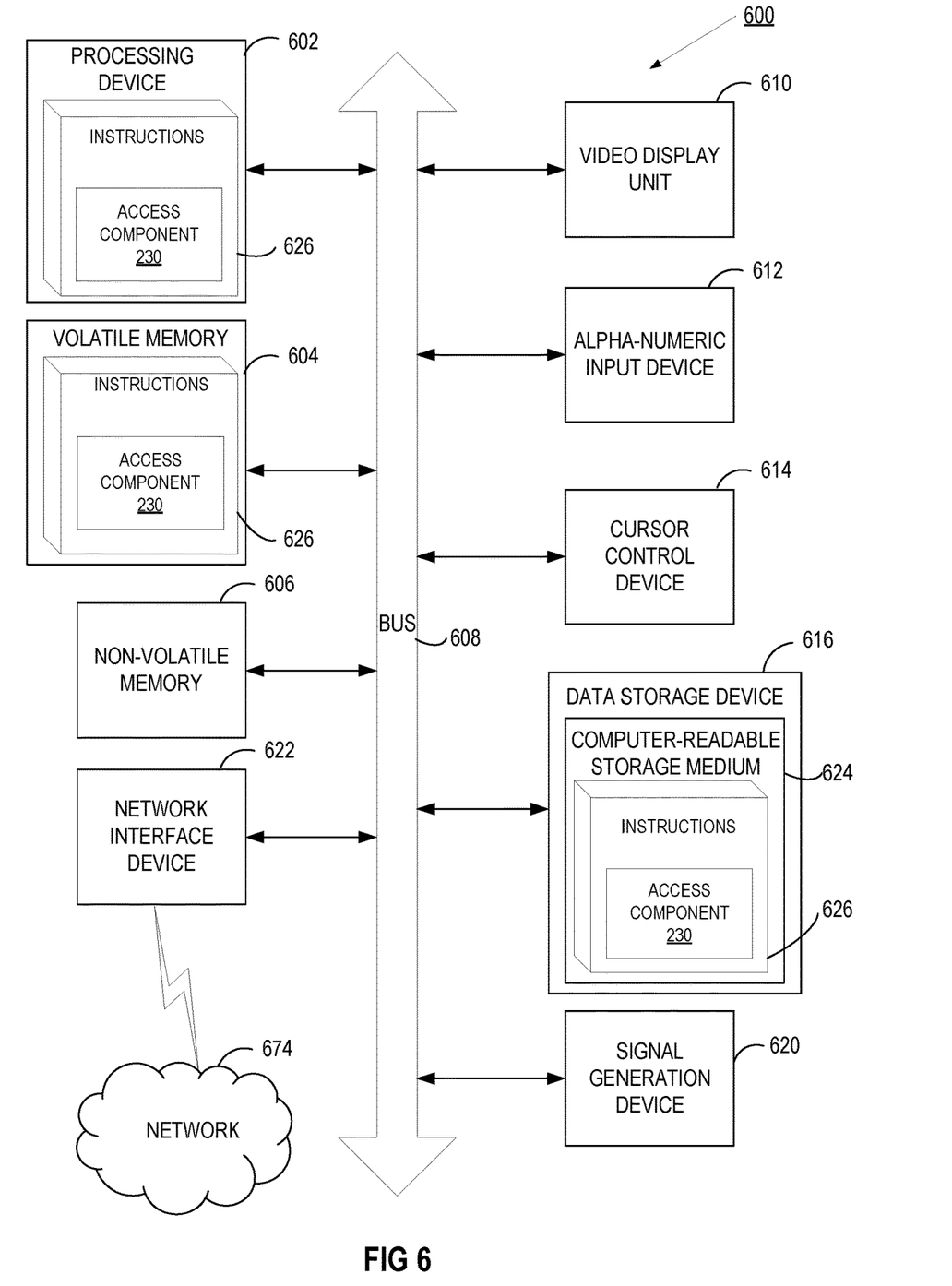
FIG. 6 depicts a block diagram of an illustrative computing device operating in accordance with the examples of the present disclosure.

FIG. 6 depicts a block diagram of a computer system operating in accordance with one or more aspects of the present disclosure. In various illustrative examples, computer system 600 may correspond to computing device 100 of FIG. 1 or 2. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing method 300 or 400 and for encoding components 210, 220, and 230 of FIG. 2.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 or 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   establishing, by a processor, a trusted execution area for a first computing process, wherein the trusted execution area comprises an encrypted storage area;
   copying data of the first computing process into the trusted execution area, wherein the data comprises executable data or non-executable data;
   storing, by the processor, a second copy of the data of the first computing process;
   enabling a second computing process to access the second copy of the data of the first computing process, wherein the data of the first computing process in the trusted execution area is inaccessible to the second computing process; and
   executing, by the processor, the first computing process using the trusted execution area,
   wherein the first computing process is an application process and the second computing process is a kernel process that manages the application process, and wherein the data in the trusted execution area is accessible to the application process and inaccessible to the kernel process.

2. The method of claim 1, wherein the first computing process is a virtual machine process and the second computing process is a hypervisor process that manages the virtual machine process, and wherein the data in the trusted execution area is accessible to the virtual machine process and inaccessible to the hypervisor process.

3. The method of claim 1, further comprising:
   inspecting, by the second computing process, the second copy of the data of the first computing process; and
   determining, by the second computing process in view of the inspecting, that the data of the first computing process that is in the trusted execution area comprises non-malicious executable code.

4. The method of claim 1, wherein the trusted execution area comprises a trusted execution environment (TEE) that comprises a portion of memory and a portion of the processor, wherein the portion of memory comprises a contiguous portion of virtual memory of the first computing process.

5. The method of claim 1, wherein enabling the second computing process to access the second copy of the data comprises the second computing process being provided a cryptographic key that enables the second computing process to decrypt the second copy of the data.

6. The method of claim 1, further comprising:
   transmitting, by the processor, a cryptographic key to a device over a network, wherein the cryptographic key is a symmetric transport key; and
   receiving, from the device over the network, the data of the first computing process and the symmetric transport key, wherein the data of the first computing process is encrypted using the cryptographic key,
   wherein storing the second copy of the data comprises storing the second copy of the data that is encrypted using the cryptographic key.

7. The method of claim 1, wherein the second copy of the data is encrypted using a first cryptographic key and the data in the trusted execution area is encrypted using a second cryptographic key.

8. The method of claim 1, wherein the trusted execution area stores the data of the first computing process in the encrypted storage area and wherein the copying the data of the first computing process comprises the processor receiving the data in an encrypted form over a bus from the encrypted storage area.

9. A system comprising:
   a memory; and
   a processing device communicably coupled to the memory, the processing device to:
   establish a trusted execution area for a first computing process, wherein the trusted execution area comprises an encrypted storage area in the memory;
   copy data of the first computing process into the trusted execution area, wherein the data comprises executable data or non-executable data;
   store a second copy of the data of the first computing process;
   enable a second computing process to access the copy of the data of the first computing process, wherein the data of the first computing process in the trusted execution area is inaccessible to the second computing process; and
   execute the data of the first computing process using the trusted execution area,
   wherein the first computing process is an application process and the second computing process is a kernel process that manages the application process, and wherein the data in the trusted execution area is accessible to the application process and inaccessible to the kernel process.

10. The system of claim 9, wherein the first computing process is a process of a virtual machine and the second computing process is a hypervisor process that manages the virtual machine, and wherein the data in the trusted execution area is accessible to the virtual machine and inaccessible to the hypervisor.

11. The system of claim 9, wherein the trusted execution area comprises a trusted execution environment (TEE) that comprises a portion of the memory and a portion of the processing device and wherein the data of the first computing process that is loaded into the trusted execution area is accessible by the first computing process and inaccessible to the second computing process.

12. The system of claim 9, wherein the second copy of the data is encrypted using a first cryptographic key and the data in the trusted execution area is encrypted using a second cryptographic key.

13. The system of claim 9, wherein the processing device is to:
  inspect, by the second computing process, the second copy of the data of the first computing process; and
  determine, by the second computing process in view of the inspection, that the data of the first computing process that is in the trusted execution area comprises non-malicious executable code.

14. A non-transitory machine-readable storage medium storing instructions which, when executed, cause a processor to perform operations comprising:
  receiving, by the processor, a request of a computing process to execute within a trusted execution environment (TEE);
  establishing the trusted execution environment for the computing process, wherein the trusted execution environment comprises an encrypted storage area;
  storing a copy of the data of the computing process;
  loading data of the computing process into the trusted execution environment, wherein the data comprises executable data or non-executable data;
  enabling a kernel to access the copy of the data of the computing process, wherein the data of the computing process in the trusted execution environment is inaccessible to the kernel; and
  inspecting, by the kernel, the copy of the data of the computing process.

15. The non-transitory machine-readable storage medium of claim 14, wherein the copy of the data is encrypted using a first cryptographic key and the data in the trusted execution environment is encrypted using a second cryptographic key.

16. The non-transitory machine-readable storage medium of claim 14, wherein the encrypted storage area comprises a contiguous portion of virtual memory of the computing process.

17. The non-transitory machine-readable storage medium of claim 14, wherein the trusted execution environment stores the data of the computing process in the encrypted storage area and wherein the loading the data of the computing process comprises the processor receiving the data in an encrypted form over a bus from the encrypted storage area.

18. The non-transitory machine-readable storage medium of claim 14, wherein enabling the kernel to access the copy of the data of the computing process comprises the processor providing a cryptographic key to the kernel that enables the kernel to decrypt the copy of the data.

19. The non-transitory machine-readable storage medium of claim 14, wherein enabling the kernel to access the copy of the data of the computing process reduces data confidentiality without reducing data integrity of the data in the trusted execution environment.

* * * * *